# 2,881,168

ORGANIC COMPOUNDS AND PROCESS

George B. Spero, Kalamazoo Township, Kalamazoo County, Mich., assignor to The Upjohn Company, Kalamazoo, Mich., a corporation of Michigan No Drawing. Application January 3, 1956
Serial No. 556,786

14 Claims. (Cl. 260—239.55)

This invention relates to 5,6-oxido-11-oxygenated-17α,21-dihydroxypregnane-3,20-dione 3,20-bis ketals and to the corresponding 21-acyloxy esters thereof. It relates more particularly to the 5α,6α-oxido and the 5β,6β-oxido isomers of the 21-hydroxy and 21-acyloxy bis ketals, in which the acyl group is that of a hydrocarbon carboxylic acid containing from one to twelve carbon atoms, inclusive, and to mixtures of such isomers.

The novel compounds of the present invention have the following structural formulas, in their respective isomeric forms, each of which has individual utility in the preparation of physiologically active steroids:

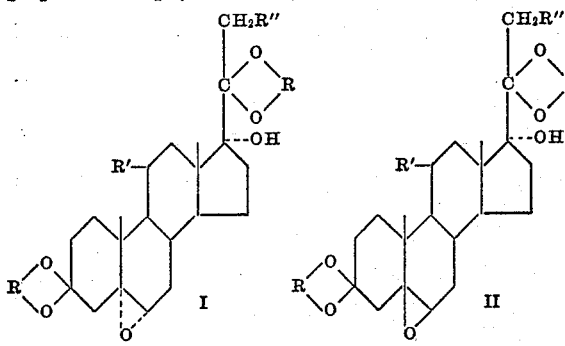

in which R is an alkylene radical containing not more than eight carbon atoms, and the attaching oxygen to carbon bonds are separated by a chain of at least two and not more than three carbon atoms, R' is α-hydroxy, β-hydroxy or keto, and R" is hydroxy or acyloxy, the acyl group being that of a hydrocarbon carboxylic acid containing from one to twelve carbon atoms, inclusive.

The compounds are made by epoxidizing a diketal compound of the following structural formula:

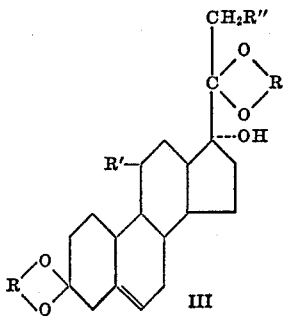

with suitable epoxidizing agents such as perbenzoic acid or other peracids capable of epoxidizing the steroid nucleus having a double bond in the 5,6-position, as will be described in detail in the following specification.

The novel compounds of the present invention are useful intermediates in the synthesis of 6β-hydroxyhydrocortisone, 6β-halohydrocortisone, 5α-hydroxydihydroallohydrocortisone, 6β-hydroxycortisone, and 6β-halocortisone, each being useful in the pharmaceutical field as the free alcohols or the corresponding 21-acylates. Representative methods for these syntheses will also be described in the following specification.

The compounds of Formula III, the starting compounds for the compounds of this invention may be made by the process of first diketalizing cortisone or the 11-hydroxy compounds by procedures well known in the art. The cortisone 3,20-bis ketal (Formula III, R'=keto and R"= hydroxy) can then be reduced with lithium aluminum hydride in known manner to convert the 11-keto group to an 11-hydroxy group. Moreover, after such reduction, the compounds can be esterified at the 21-hydroxy group to produce the 21-acyloxy compounds.

The epoxidation of the compounds of Formula III is carried out in an inert solvent, employing epoxidizing agents such as the peracids, e.g., perbenzoic acid, peracetic acid, or other known epoxidizing agents.

Inert solvents for the reaction include the hydrocarbons such as hexane, heptane, petroleum ether, and other inert organic solvents such as dioxane, carbon tetrachloride, chloroform, trichlorethylene, and the like.

The epoxidizing reaction takes place over a rather wide range of temperature; minus fifteen degrees centigrade up to the boiling point of the reaction mixture being suitable, and temperatures between zero degrees centigrade and sixty degrees centigrade being most convenient.

The oxidation yields a mixture of the 5α,6α-oxido isomer and the 5β,6β-oxido isomer, the former predominating in amount. For the purpose of further synthesis of 6-hydroxyhydrocortisone or 6-hydroxycortisone, either of the two products, or the mixture, may be utilized. The 5α,6α-oxido isomer, however, is required for the synthesis of the 5α-hydroxydihydrohydrocortisone, 5α-hydroxydihydrocortisone, 6β - halohydrocortisone, or 6β - halocortisone.

The mixture of both the alpha and beta oxides, produced in the epoxidation reaction, can be separated by chromatographic or crystallization techniques or combination of these, all well known in the art. As examples of separation of the two isomers, the reaction product may be dissolved in a suitable solvent such as methylene chloride and chromatographed over an adsorbent such as alumina, acid washed alumina, or the like and subsequently developed with suitable solvent mixtures. Alternatively, the reaction product may be fractionally crystallized to produce a first crop of product and the mother liquor chromatographed.

The compounds of this invention are useful as the free 21-hydroxy compounds or as the 21-acyloxy compounds as will appear from the examples which follow. The latter can be prepared from the former by esterifying the 21-hydroxy group at the stage of Compounds I and II. This acylation can be performed under the esterification conditions known in the art, e.g., by the reaction of the 21-hydroxy Compounds I or II or mixtures thereof with the selected acid anhydride or acid chloride or bromide of a hydrocarbon carboxylic acid, or by reaction with the selected acid, in the presence of an esterification catalyst or with an ester under ester exchange reaction conditions. The esters also can be formed by esterification at the stage of Compound III.

Compounds thus produced include the compounds represented by Formulas I and II in which R" is the acyl radical of a hydrocarbon carboxylic acid containing from one to twelve carbon atoms, inclusive, e.g., propionic, butyric, isobutyric, valeric, isovaleric, trimethylacetic, 2-methylbutyric, 3-ethylbutyric, hexanoic, diethylacetic, triethylacetic, heptanoic, octanoic, α-ethylisovaleric, succinic, chloroacetic, chloroformic, glutaric, diglycolic, a cyclic acid, e.g., cyclopropylideneacetic, cyclopentylformic, cyclopentylacetic, β-cyclohexylpropionic, cyclohexylformic, cyclohexylacetic, β-cyclohexylpropionic, an aryl or alkaryl acid, e.g., benzoic, 2-, 3- or 4-methylbenzoic, 2,3- 2,4-, 2,5-, 2,6-, 3,4- and 3,5-dimethylbenzoic, ethylbenzoic, 2,4,6-trimethylbenzoic, 2,4,6-triethylbenzoic, α-naphthoic, 3-methyl-α-naphthoic, an aralkyl acid, e.g., phenylacetic, phenylpropionic, diphenylacetic, triphenylacetic, and the like.

The starting material for the preparation of cortisone analogues can be the 3,20-bis ketals of either cortisone or hydrocortisone, as previously mentioned. With cortisone, the cortisone analogues are obtained directly; with hydrocortisone, the 5,6-oxido compounds of hydrocortisone, i.e., Compounds I or II in which R' is hydroxy, can be converted to the cortisone analogues by known methods for converting hydrocortisone to cortisone. In such conversion, the 21-hydroxy group is protected as by acylation and the compound is oxidized by means of a chromic acid or sodium dichromate oxidation.

The 6-substituted cortisone, hydrocortisone, and 21-esters thereof described below have antiphlogistic, antirheumatic, anti-arthritic, some mineralocorticoid, and anti-inflammatory activity. They are useful in the treatment of inflammatory conditions of the skin, eyes and ears of humans and domestic animals which are caused by a variety of bacterial and fungal infections, contact dermatitis and other allergenic reactions.

The compounds of the present invention are treated as follows in the synthesis of 6-hydroxyhydrocortisone or cortisone compounds, i.e., by hydrolysis of either the alpha isomer or the beta isomer or mixtures of the two, to open the 5,6-oxido linkage, followed by treatment with dehydrating agents, according to the following scheme.

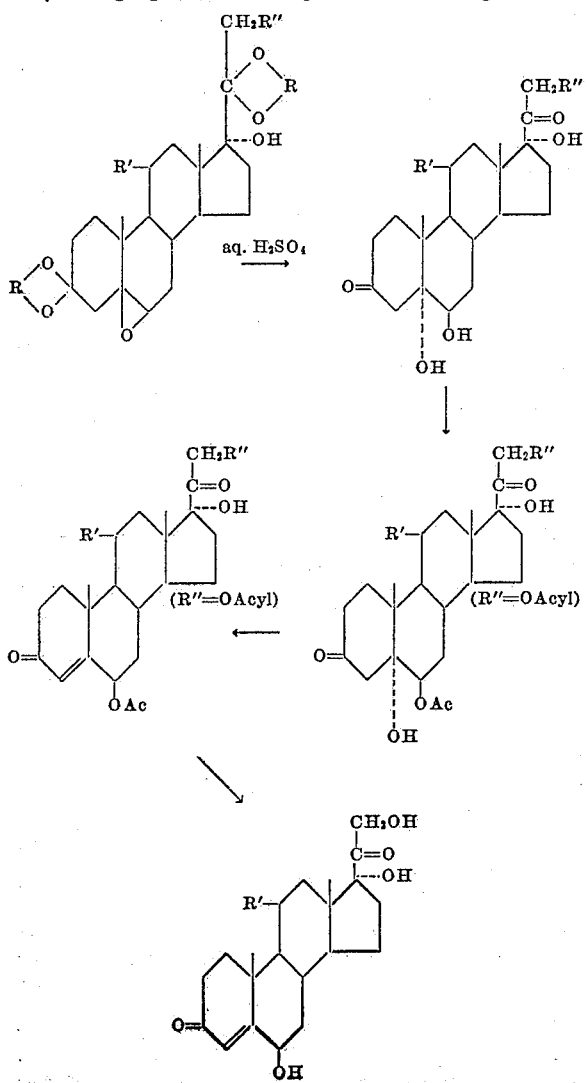

The foregoing reaction illustrates the reaction utilizing the beta isomer, Compound II, of the invention. The hydrolysis reaction mechanism attacks the oxido linkage extending between the oxido oxygen atom and the 5-carbon atom of the steroid nucleus. The reaction is essentially the same in the case of the alpha isomer, Compound I, of the invention, except that the point of attack is between the oxido oxygen and the 6-carbon atom of the steroid nucleus. In both cases the resulting product of the epoxide opening step is the 5α,6β-dihydroxy compound, i.e., 5α,6β,11β,17α,21-pentahydroxyallopregnane-3,20-dione and 5α,6β,17α,21-tetrahydroxyallopregnane-3,11,20-trione, respectively, depending upon whether R' is β-hydroxy or keto. In the event a 21-acyloxy compound of this invention is substituted at the beginning, the epoxide opening step is exactly the same, the 5α,6β-dihydroxy compound being the 21-acyloxy analogue. However, in the subsequent steps of the preparation of 6β-hydroxy products from the 21-acyloxy analogues, i.e., 5α,6β,11β,17α-tetrahydroxy-21-acyloxyallopregnane-3,20-dione or 5α,6β,17α-trihydroxy-21-acyloxyallopregnane-3,11,20-trione, the subsequent acylation step shown above is exactly the same, effecting acylation of the 6-hydroxyl group only.

The epoxide opening step, which also hydrolyzes the two ketal groups, can be accomplished by hydrolysis in the presence of well known hydrolysis agents. Acid hydrolytic agents are preferred, such as, for example, sulfuric acid, p-toluenesulfonic acid, and the like. The step is carried out preferably in water miscible inert solvents such as acetone, methanol, dioxane, tetrahydrofuran and the like.

The acylation step can be carried out in exactly the same manner as described for the 21-acylation step of the 21-hydroxy compounds of Formulas I and II, employing, however, sufficient excess acylating agent to react with the 6-hydroxy group, as necessary when employing the 21-hydroxy compounds of I and II.

The dehydration reaction of the above sequence of reactions is carried out by reacting the 6,21-diacylated compound with a dehydrating agent to produce 11β,17α-dihydroxy-6β,21-diacyloxy-4-pregnene-3,20-dione. Acetic anhydride, p-toluenesulfonic acid and acetic acid, or thionyl chloride and pyridine are suitable as dehydrating agents.

The final saponification step can be carried out, for example, using aqueous sodium hydroxide in an atmosphere of nitrogen or other inert gas, to produce the known 6β-hydroxyhydrocortisone.

The preparation of 6-halohydrocortisone is accomplished by treating the 5α,6α-oxido-11β,17α,21-trihydroxyallopregnane-3,20-dione 3,20-bis ketals of this invention with aqueous hydrogen halides such as hydrogen fluoride in an epoxide opening step followed by a dehydration step, viz:

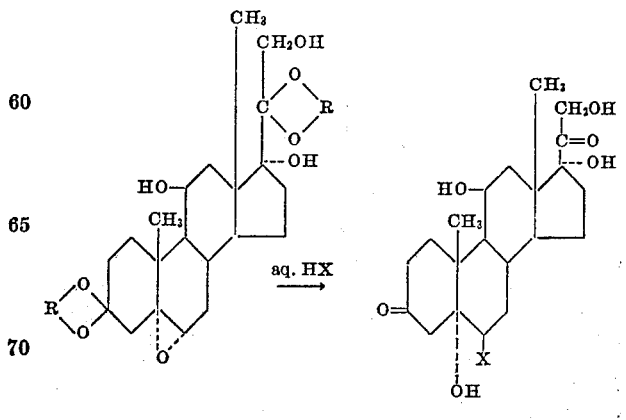

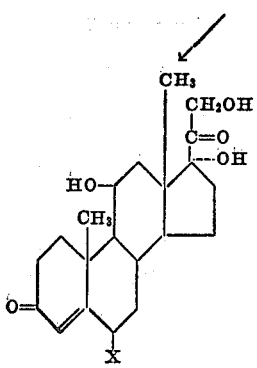

in which X is a halogen atom having an atomic weight from nineteen to eighty, inclusive, i.e., fluorine, chlorine or bromine. In the foregoing reaction, 5α,6α-oxido-17α,21 - dihydroxyallopregnane - 3,11,20 - trione 3,20-bis ketals are substituted to produce 6β-halocortisone in the same manner. Moreover, as explained below, intervening conversion steps of the 11-oxygen substituent in either alternative can be carried out.

In the epoxide opening step of the above reaction, Compound I, preferably the 3,20-ethylene glycol bis ketal, is reacted with hydrogen fluoride, hydrogen chloride or hydrogen bromide, preferably hydrogen fluoride, to open the oxide and produce the 5α,21-dihydroxy-6β-halo-11-oxygenated-3,20-pregnadiene. The reaction is ordinarily performed at between about minus forty and plus fifty degrees centigrade, the preferred limits being about zero to 25 degrees centigrade. A catalyst may be employed, e.g., boron trifluoride under anhydrous conditions or a hypohalous acid under aqueous conditions. Reaction conditions, for example, those disclosed by Schmidlin et al., Helv. Chim. Acta, 36, 1241 (1953); Gallagher, J. Biol. Chem., 162, 495 (1946); Cornforth et al., J. Chem. Soc., 1954, 907 and Fried et al., J. Am. Chem. Soc., 75, 2273 (1953), are usually employed.

If anhydrous conditions are maintained in the first step of the above reactions, i.e., starting with either the 5α,6α-oxido-11β,17α,21-trihydroxyallopregnane-3,20-dione 3,20-bis ketals shown in the equation above or with the 5α,6α-oxido-17α,21-dihydroxyallopregnane-3,11,20-trione 3,20-bis ketal analogues, the opening of the 5α,6α-epoxide ring takes place as an initial stage of the reaction. This may be followed by the introduction of a small amount of water into the reaction mixture, ordinarily with heating, to remove the ketal groups by hydrolysis. On the other hand, if water is present in significant amounts in the reaction mixture, the 5α,6α-epoxide ring is opened and the ketal groups are hydrolyzed at the same time.

An advantageous feature of carrying out the epoxide opening and the ketal hydrolysis in separate stages is realized in those instances where it is desired to transform an 11-keto group to an 11β-hydroxy group or vice versa. These conversions can be carried out at the end of the epoxide opening step, i.e., before the ketal groups have been removed, the conditions for conversion being those conventionally employed in converting 11-oxygen groups in steroids, for example, reduction by lithium aluminum hydride or oxidation by chromic acid, respectively.

The 6β-halo - 11-oxygen - substituted-5α,17α,21-trihydroxyallopregnane-3,20-dione produced according to the reactions described above are then treated with dehydrating agents such as acetic anhydride, acetic acid, p-toluenesulfonic acid, or thionyl chloride in pyridine to produce 6β-halohydrocortisone or 6β-halocortisone, depending upon whether the 11-oxygen substituent is β-hydroxy or keto.

The dehydration step shown in the above reaction scheme results in a 6β-halo-11-oxygenated-21-acyloxy-4-pregnene-3,20-dione. It is carried out with the aid of dehydrating agents such as acetic anhydride, p-toluenesulfonic acid, acetic acid, and the like.

The preparation of the 5α-hydroxy compounds (5α-hydroxydihydrohydrocortisone and its 21-acyl derivatives) is accomplished by reductive opening of the 5,6-oxido linkage of Compound I. The opening is accomplished with a reducing agent such as lithium aluminum hydride in an inert solvent such as ether, dioxane, tetrahydrofuran and the like. These 5α-hydroxydihydrohydrocortisone compounds, particularly 5α-hydroxydihydrohydrocortisone are known to possess physiological activity of the same order as cortisone acetate.

The following examples are illustrative of the process and products of the present invention, but are not to be construed as limiting.

EXAMPLE 1

5,6-oxido-11β,17α,21 - trihydroxypregnane - 3,20 - dione 3,20-bis (ethylene ketal)

To a solution of 0.901 gram of 11β,17α,21-trihydroxy-5-pregnene-3,20-dione 3,20-bis (ethylene ketal) in eighteen milliliters of chloroform was added a solution of 331 milligrams of perbenzoic acid in 5.19 milliliters of chloroform. The resulting solution was allowed to stand in the refrigerator (ca. four degrees centigrade) for a period of 24 hours and at room temperature for an additional period of 72 hours. The reaction solution was then washed with five percent sodium bicarbonate solution and water, and was dried and evaporated to dryness to give 1.031 gram of crude solid. Recrystallization from acetone gave 431 milligrams, M.P. 230–247 degrees centigrade. The mother liquor, after evaporation to dryness, was dissolved in methylene chloride and chromatographed over 25 grams of acid washed alumina. The column was developed with three fractions each of methylene chloride plus five, ten, fifteen, twenty, 25 and fifty percent acetone, acetone, and acetone plus five percent methanol. The acetone plus five percent methanol eluate gave an additional 279 grams of the high melting product. A second fraction from the column was eluted with methylene chloride plus fifty percent acetone and acetone. This weighed 142 milligrams and on recrystallization melted at 195–197 degrees centigrade. It was the 5β,6β-isomer. The high melting material, the 5α, 6α-isomer, after several recrystallizations from acetone and from methanol, melted at 263–268 degrees centigrade.

EXAMPLE 2

5,6-oxido-11α,17α,21 - trihydroxypregnane - 3,20 - dione 3,20-bis (ethylene ketal)

In exactly the same manner as Example 1, the 11α,17α,21-trihydroxy-5-pregnene-3,20-dione 3,20-bis (ethylene ketal) was epoxidized in a chloroform reaction medium to yield a mixture of 5α,6α-oxido- and 5β,6β-oxido-11α,17α,21-trihydroxypregnane-3,20-dione 3,20-bis (ethylene ketal).

EXAMPLE 3

5,6-oxido-17α,21 - dihydroxypregnane - 3,11,20 - trione 3,20-bis (1,2-propylene ketal)

To a solution of 1.00 gram of 17α,21-dihydroxy-5-pregnene-3,11,20-trione 3,20-bis (1,2-propylene ketal) in chloroform was added a solution of perbenzoic acid in chloroform and the resulting solution allowed to stand in a refrigerator and then at room temperature, following the procedure of Example 1. The reaction solution was washed, dried, and evaporated as in Example 1. Recrystallization from acetone followed by fractionation of the mother liquor on a column of acid washed alumina, using the technique of Example 1 yielded 5α,6α-oxido-17α,21 - dihydroxyallopregnane - 3,11,20-trione 3,20-bis (1,2-propylene ketal) and 5β,6β-oxido-17α,21-dihydroxypregnane-3,11,20-trione 3,20-bis (1,2 - propylene ketal).

Example 4

*5α,6α-oxido-11β,17α-dihydroxy-21 - acetoxyallopregnane-3,20-dione 3,20-bis (ethylene ketal)*

A solution of 0.5 gram of the high melting product of Example 1 [i.e., 5α,6α-oxido-11β,17α,21-trihydroxyallopregnane-3,20-dione 3,20-bis (ethylene ketal)] in five milliliters of pyridine and five milliliters of acetic anhydride was allowed to stand at room temperature for a period of 18.5 hours and was then poured into 100 milliliters of ice and water to give 447 milligrams of crystalline product. 5α,6α-oxido-11β,17α-dihydroxy-21-acetoxyallopregnane-3,20-dione 3,20-bis (ethylene ketal), M.P. 246–255 degrees centigrade. Two recrystallizations from acetone raised the melting point to 252–255 degrees centigrade; [α]$_D$ minus 32 degrees (acetone).

*Analysis.*—Calcd. for $C_{27}H_{40}O_9$: C, 63.76; H, 7.93. Found: C, 64.07; H, 8.05.

Example 5

*5β,6β - oxido - 11β,17α - dihydroxy - 21 - acetoxypregnane-3,20-bis (ethylene ketal)*

A solution of 100 milligrams of 5β,6β-oxido-11β,17α,21-trihydroxypregnane-3,20-dione 3,20-bis (ethylene ketal) in one milliliter of pyridine and one milliliter of acetic anhydride was allowed to stand at room temperature for 18.5 hours and was then poured into twenty milliliters of ice and water to give 61 milligrams of crude product melting at about 190–200 degrees centigrade. An additional 28 milligrams of product was obtained by extraction of the filtrate with methylene chloride. The total (89 milligrams) was recrystallized from acetone-Skellysolve B (technical hexane) and from acetone isopropyl ether to give 64 milligrams of purified product, 5β,6β-oxido-11β,17α-dihydroxy-21-acetoxypregnane-3,20-dione 3,20-bis (ethylene ketal), M.P. 194–197 degrees centigrade; [α]$_D$ plus 127 degrees (acetone).

*Analysis.*—Calcd. for $C_{27}H_{40}O_9$: C, 63.76; H, 7.93. Found: C, 63.83; H, 8.60.

In place of the 3,20-diethylene ketal of Examples 4 and 5, above, the corresponding 3,20-dipropylene or other alkylene ketals can be used. A starting steroid, i.e., cortisone or hydrocortisone is contacted with an alkane-α-diol, in the presence of an acid catalyst, producing the 3,20-diketalized product. Representative diketals are those from propane-1,2-diol, butane-1,2-diol, 3 - methylbutane - 1,2 - diol, butane-2,3-diol, pentane-2,3-diol, hexane-1,2-diol, heptane-1,2-diol and the like.

Likewise, in place of acetic anhydride in Examples 4 and 5, other esterifying acids can be used as for example, propionic anhydride, butyric anhydride, valeric anhydride, cyclopentylpropionyl bromide, octanoyl bromide, cyclohexylacetyl chloride, and the like to produce the corresponding 21-esters.

Example 6

*5α,11β,17α,21 - tetrahydroxyallopregnane - 3,20 - dione*

A solution of 100 milligrams of 5α,6α-oxido-11β,17α, 21 - trihydroxypregnane - 3,20 - dione 3,20-bis (ethylene ketal) in four milliliters of tetrahydrofuran was added to a suspension of 100 milligrams of lithium aluminum hydride in ten milliliters of anhydrous ether. After standing at room temperature for a period of one hour, five milliliters of water was carefully added followed by three milliliters of one Normal sulfuric acid. The mixture was made homogeneous by the addition of acetone and was then gently boiled on the steam bath for a period of fifteen minutes, cooled, and poured into about fifty milliliters of water. Extraction with ethyl acetate and removal of the solvent gave 96 milligrams of crude solid which after six recrystallizations from ethyl acetate and from acetone gave 5α,11β,17α,21-tetrahydroxyallopregnane - 3,20 - dione, M.P. 260–265 degrees centigrade.

Example 7

*5α,6β,11β,17α,21 - pentahydroxyallopregnane - 3,20 - dione*

A suspension of 0.5 gram of 5α,6α-oxido-11β,17α,21-trihydroxyallopregnane - 3,20 - dione 3,20 - bis (ethylene ketal) in twenty milliliters of acetone and four milliliters of water containing 0.1 milliliter of surfuric acid was stirred for a period of eighteen hours during which time the solid went into solution, made neutral with ten percent sodium hydroxide and evaporated to dryness in a stream of nitrogen. The residue was digested with three 25-milliliter fractions of acetone, the acetone solution evaporated to dryness, and this residue put over an acid washed alumina column. The fraction eluted with acetone plus ten percent methanol (344 milligrams) was crystallized from acetone-ethyl acetate to give 51 milligrams of crystals, M.P. 225–235 degrees centigrade, of 5α,6β,11β,17α,21 - pentahydroxyallopregnane - 3,20 - dione.

Following the procedure of Example 7, the mixture of 5α,6α-oxido and 5β,6β-oxido isomers before separation by crystallization or adsorption can be used in place of the 5α,6α-oxido of the example to produce 5α,6β,11β, 17α,21-pentahydroxyallopregnane-3,20-dione. Likewise, the 5β,6β-oxido isomer can be employed to give the same result.

It is to be understood that the invention is not to be limited to the exact details of operation or exact compounds shown and described, as obvious modifications and equivalents will be apparent to one skilled in the art, and the invention is therefore to be limited only by the scope of the appended claims.

I claim:

1. 5,6 - oxido - 17α,21 - dihydroxy - 11 - oxygenated - pregnane-3,20-dione 3,20-bis ketal selected from a compound of the following formula:

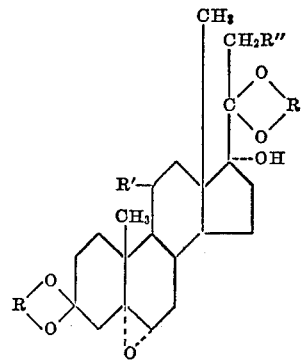

and a compound of the following formula:

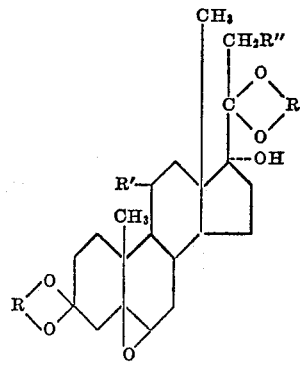

in which R is an alkylene radical containing not more than eight carbon atoms, and the attaching oxygen to carbon bonds are separated by a chain of at least two and not more than three carbon atoms, R' is selected from the group consisting of α-hydroxy, β-hydroxy, and keto, and R'' is a member of the group consisting of hydroxy and acyloxy, the acyl group being that of a hydrocarbon carboxylic acid containing from one to twelve carbon atoms, inclusive.

2. 5,6 - oxido - 11β,17α - dihydroxy - 21 - acyloxypregnane-3,20-dione 3,20-bis (lower alkylene ketal) in which the acyl group is that of a hydrocarbon carboxylic acid containing from one to eight carbon atoms, inclusive.

3. 5α,6α - oxido - 11β,17α - dihydroxy - 21 - acetoxyallopregnane-3,20-dione 3,20-bis (lower alkylene ketal).

4. 5α,6α - oxido - 11β,17α,21 - trihydroxyallopregnane-3,20-bis (lower alkylene ketal).

5. 5β,6β - oxido - 11β,17α,21 - trihydroxypregnane-3,20-dione 3,20-bis (lower alkylene ketal).

6. 5,6 - oxido - 17α - hydroxy - 21 - acyloxypregnane-3,11,20-trione 3,20-bis (lower alkylene ketal), wherein the acyl group is that of a hydrocarbon carboxylic acid containing from one to twelve carbon atoms, inclusive.

7. 5α,6α - oxido - 17α - hydroxy - 21 - acetoxyallopregnane-3,11,20-trione 3,20-bis (lower alkylene ketal).

8. 5α,6α - oxido - 17α,21 - dihydroxyallopregnane-3,11,20-trione 3,20-bis (lower alkylene ketal).

9. The process comprising epoxidizing a compound selected from the group consisting of a 3,20-bis alkylene ketal of cortisone, hydrocortisone, a 21-ester of cortisone and a 21-ester of hydrocortisone with an organic peracid in the presence of an inert solvent for the reaction.

10. The method for producing 5,6-oxido-11β,17α,21-trihydroxypregnane-3,20-dione 3,20-bis (lower alkylene ketal) comprising epoxidizing 11β,17α,21-trihydroxy-5-pregnene-3,20-dione 3,20-bis (lower alkylene ketal) with an organic peracid in the presence of an inert solvent for the reaction.

11. The method for producing 5α,6α-oxido-11β,17α,21-trihydroxyallopregnane-3,20-dione 3,20-bis (lower alkylene ketal) and 5β,6β-oxido-11β,17α,21-trihydroxypregnane-3,20-dione 3,20-bis (lower alkylene ketal) comprising epoxidizing 11β,17α,21-trihydroxy-5-pregnene-3,20-dione 3,20-bis (lower alkylene ketal) with an organic peracid in the presence of an inert solvent for the reaction and recovering separately each of the said 5α,6α-oxido and 5β,6β-oxido isomers thus produced.

12. The method for producing 5,6-oxido-17α,21-dihydroxypregnane-3,11,20-trione 3,20-bis (lower alkylene ketal) comprising epoxidizing 17α,21-dihydroxy-5-pregnene-3,11,20-trione 3,20-bis (lower alkylene ketal) with an organic peracid in the presence of an inert solvent for the reaction.

13. The method for producing 5α,6α-oxido-17α,21-dihydroxyallopregnane-3,11,20-trione 3,20-bis (lower alkylene ketal) and 5β,6β-oxido-17α,21-dihydroxypregnane-3,11,20-trione 3,20-bis (lower alkylene ketal) comprising epoxidizing 17α,21-dihydroxy-5-pregnene-3,11,20-trione 3,20-bis (lower alkylene ketal) with an organic peracid in the presence of an inert solvent for the reaction and recovering separately each of the said 5α,6α-oxido and 5β,6β-oxido isomers thus produced.

14. 5α,6α - oxido - 11β,17α,21 - trihydroxyallopregnane-3,20-dione 3,30-bis (ethylene ketal).

References Cited in the file of this patent
UNITED STATES PATENTS 2,742,461     Bernstein _____ Apr. 17, 1956

UNITED STATES PATENT OFFICE

Certificate of Correction

April 7, 1959

Patent No. 2,881,168

George B. Spero

It is hereby certified that error appears in the printed specification of the above numbered patent requiring correction and that the said Letters Patent should read as corrected below.

Column 2, lines 23, 25, and 26, for "centrigrade", each occurrence, read —centigrade—; column 6, line 21, for "-pregnane-" read —-pregnene-—; column 7, lines 21 and 22, for "-acetoxypregnane-3,20-bis (ethylene ketal)" read —-acetoxypregnane-3,20-dione 3,20-bis (ethylene ketal)—; column 9, line 12, for "3,20-bis" read —3,20-dione 3,20-bis—; column 10, line 26, for "3,30-bis" read —3,20-bis—.

Signed and sealed this 4th day of August 1959.

[SEAL]

Attest:
KARL H. AXLINE,
*Attesting Officer.*

ROBERT C. WATSON,
*Commissioner of Patents.*